United States Patent
Kato et al.

(10) Patent No.: US 7,819,991 B2
(45) Date of Patent: *Oct. 26, 2010

(54) FERRITIC STAINLESS STEEL SHEET FOR RAW MATERIAL PIPE FOR BELLOWS PIPE

(75) Inventors: Yasushi Kato, Tokyo (JP); Yoshihiro Ozaki, Tokyo (JP); Osamu Furukimi, Tokyo (JP); Norimasa Hirata, Tokyo (JP); Takumi Ujiro, Tokyo (JP)

(73) Assignee: JFE Steel Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/918,934

(22) PCT Filed: May 29, 2006

(86) PCT No.: PCT/JP2006/311158

§ 371 (c)(1), (2), (4) Date: Oct. 19, 2007

(87) PCT Pub. No.: WO2006/132164

PCT Pub. Date: Dec. 14, 2006

(65) Prior Publication Data

US 2009/0004040 A1    Jan. 1, 2009

(30) Foreign Application Priority Data

Jun. 9, 2005 (JP) ............................ 2005-169520
Jun. 9, 2005 (JP) ............................ 2005-169521
Jun. 9, 2005 (JP) ............................ 2005-169522

(51) Int. Cl.
C22C 38/22 (2006.01)
C22C 38/26 (2006.01)

(52) U.S. Cl. ............................ 148/325; 420/68; 420/69; 420/64

(58) Field of Classification Search ............... 148/325, 148/909; 420/64, 65, 62, 68, 69
See application file for complete search history.

(56) References Cited

U.S. PATENT DOCUMENTS

| | | | | |
|---|---|---|---|---|
| 5,489,345 | A | * | 2/1996 | Koike et al. ............... 148/325 |
| 5,806,899 | A | * | 9/1998 | Norikawa et al. .......... 285/299 |
| 6,911,098 | B2 | * | 6/2005 | Yazawa et al. ............. 148/325 |

FOREIGN PATENT DOCUMENTS

| | | | |
|---|---|---|---|
| JP | 2002-212683 A | | 7/1922 |
| JP | 7-268560 A | | 10/1995 |
| JP | 408060306 | * | 3/1996 |
| JP | 8-176750 A | | 7/1996 |
| JP | 8-188854 A | | 7/1996 |
| JP | 08-283914 | * | 10/1996 |
| JP | 9-125208 A | | 5/1997 |
| JP | 2004218013 | * | 8/2004 |

OTHER PUBLICATIONS

Machine-English translation of Japanese patent 08-283914, Takada Takeshi et al., Oct. 29, 1996.*

* cited by examiner

*Primary Examiner*—Deborah Yee
(74) *Attorney, Agent, or Firm*—DLA Piper LLP (US)

(57) ABSTRACT

A ferritic stainless steel sheet for forming a raw material pipe for bellows pipe is excellent in formability and high-temperature properties (high-temperature salt corrosion resistance and high-temperature fatigue properties). Specifically, the ferritic stainless steel sheet for forming a raw material pipe for bellows pipe contains 0.015% by mass or less of C, 1.0% by mass or less of Si, 1.0% by mass or less of Mn, 0.04% by mass or less of P, 0.010% by mass or less of S, 11% to 19% by mass of Cr, 0.015% by mass or less of N, 0.15% by mass or less of Al, 1.25% to 2.5% by mass of Mo, 0.3% to 0.7% by mass of Nb, 0.0003% to 0.003% by mass of B, and the balance being Fe and incidental impurities. In the ferritic stainless steel sheet for forming a raw material pipe for bellows pipe, preferably, the average crystal grain diameter D of the steel sheet is 35 μm or less, and alternatively, the surface roughness Ra of the steel sheet is 0.40 μm or less.

8 Claims, 3 Drawing Sheets

FERRITIC STAINLESS STEEL SHEET FOR RAW MATERIAL PIPE FOR BELLOWS PIPE

RELATED APPLICATION

This is a §371 of International Application No. PCT/JP2006/311158, with an international filing date of May 29, 2006 (WO 2006/132164 A1, published Dec. 14, 2006), which is based on Japanese Patent Application Nos. 2005-169520, filed Jun. 9, 2005, 2005-169521, filed Jun. 9, 2005, and 2005-169522, filed Jun. 9, 2005.

TECHNICAL FIELD

This disclosure relates to ferritic stainless steel sheets used for forming raw material pipes for bellows pipes and, more particularly, relates to a ferritic stainless steel sheet used for forming a raw material pipe for bellows pipe, the ferritic stainless steel sheet being excellent in form ability, high-temperature fatigue properties, and high-temperature salt corrosion resistance.

BACKGROUND

In mechanical apparatuses treating liquids, gases, powders, or the like, such materials are generally transported through metal piping. Bellows (also referred to as "flexible tubing"), which are accordion steel pipes having parallel corrugated walls, are usually installed in the middle of the piping to absorb strain and stress resulting from vibration of the mechanical apparatuses and thermal expansion of the piping and to reduce the effect thereof.

Conventionally, face-centered-cubic (FCC) metals, such as copper and SUS304 (austenitic stainless steel), are mainly used as the raw material used for bellows. The reason for this is that other metal materials are difficult to be formed into bellows. That is, in copper and austenitic stainless steel sheets, the elongation at around room temperature and the n-value are larger than those of other metal materials, and thus are suitable for bulge forming that requires an elongation characteristic.

However, in austenitic stainless steel sheets, although easy to be formed into bellows, in the case where gases, liquids, or the like that pass through the bellows are highly corrosive or have high temperatures, oxidization, high-temperature corrosion, or stress corrosion cracking easily occurs, which is a problem. In particular, in bellows made of austenitic stainless steel sheets which are used in coupling parts of automotive exhaust pipes, the service temperature is increased to about 500° C. to 750° C. Consequently, when salt, which is spread over roads for snow melting purposes, adheres to the bellows, the material itself is sensitized, easily resulting in high-temperature salt corrosion, which is also a problem.

Under these circumstances, various types of ferritic stainless steel sheet used for raw material pipes for bellows pipes have been invented. For example, Japanese Unexamined Patent Application Publication No. 7-268560 discloses a ferritic stainless steel sheet having excellent bellows formability, in which by setting the C, Si, Mn, S, Cr, Al, Ti, N, and O contents in specific ranges, an elongation of 35% or more and an r-value of 1.5 or more are achieved. Japanese Unexamined Patent Application Publication No. 8-176750 discloses a ferritic stainless steel sheet having excellent bellows formability, in which the C, Cr, Al, N, Si, Mn, Ti, Nb, Mo, Cu, and Ni contents are set in specific ranges and the crystal grain diameter is limited to an optimum range. Japanese Unexamined Patent Application Publication No. 8-188854 discloses a ferritic stainless steel sheet having excellent bellows formability and high-temperature fatigue properties, in which the C, Cr, Al, N, Si, Mn, Ti, Nb, Mo, Cu, and Ni contents are set in specific ranges. Furthermore, Japanese Unexamined Patent Application Publication No. 9-125208 discloses a ferritic stainless steel sheet having excellent bellows formability and high-temperature salt corrosion resistance, in which the C, Cr, N, Ti, and Mo contents are set in specific ranges and the surface roughness of the material is limited to an optimum range.

Figure 6:
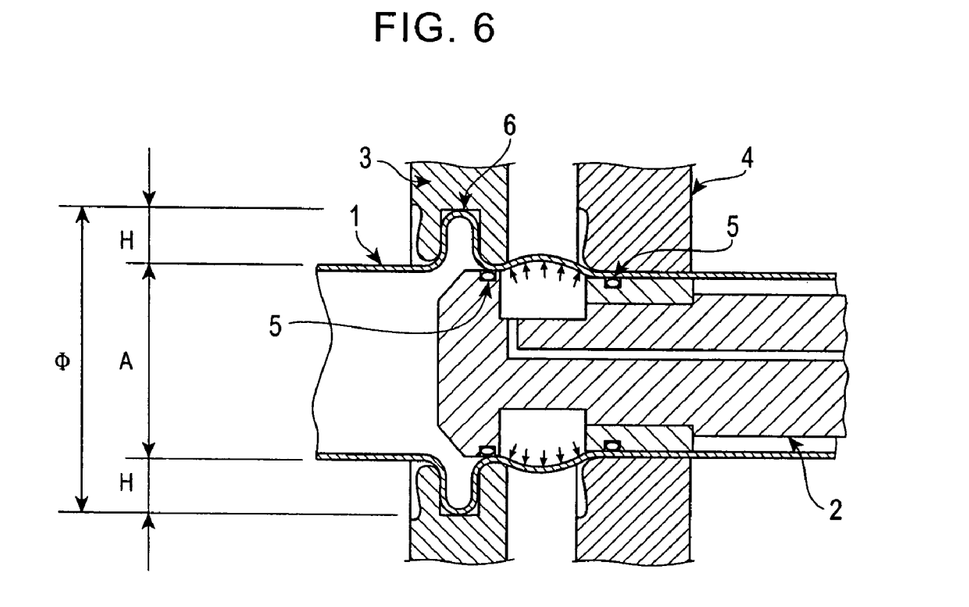
FIG. 6 is a schematic diagram showing a hydraulic forming process in which one bulge is formed.

However, even if the techniques described above are used, the bellows formability of a raw material pipe formed of a ferritic stainless steel sheet is still insufficient compared with a raw material pipe formed of an austenitic stainless steel sheet. It has not been possible to provide a ferritic stainless steel sheet for forming a raw material pipe for bellows pipe, which is also applicable to a shape having a higher peak height H of the bellows pipe. The peak height H of the bellows pipe is, as shown in FIG. 6, defined as one half of the difference between the outside diameter Φ at a peak and the outside diameter A at a bottom of a bellows pipe (outside diameter A of a raw material pipe for bellows pipe). Moreover, from the standpoint of improvement in mileage in automobiles, requirements for high-temperature properties (high-temperature salt corrosion resistance and high-temperature fatigue properties) in automotive exhaust system materials, etc. tend to be severer. It has been strongly desired to develop a ferritic stainless steel sheet which is used for forming a raw material pipe for bellows pipe and which satisfies these properties and has excellent formability.

Thus, it could be advantageous to provide a ferritic stainless steel sheet used for forming a raw material pipe for bellows pipe in which both excellent bellows formability and excellent high-temperature properties (high-temperature salt corrosion resistance and high-temperature fatigue properties) are obtained.

SUMMARY

We found that the formability of the raw material pipe for bellows pipe is improved by the addition of a small amount of B to a ferritic stainless steel sheet serving as the raw material and also that the high-temperature properties, i.e., high-temperature salt corrosion resistance and high-temperature fatigue properties, are improved by adding proper amounts of Nb and Mo together.

That is, we provide a ferritic stainless steel sheet for forming a raw material pipe for bellows pipe containing 0.015% by mass or less of C, 1.0% by mass or less of Si, 1.0% by mass or less of Mn, 0.04% by mass or less of P, 0.010% by mass or less of S, 11% to 19% by mass of Cr, 0.015% by mass or less of N, 0.15% by mass or less of Al, 1.25% to 2.5% by mass of Mo, 0.3% to 0.7% by mass of Nb, 0.0003% to 0.003% by mass of B, and the balance being Fe and incidental impurities.

The stainless steel sheet further contains, in addition to the composition described above, one or two or more selected from 0.1% to 0.6% by mass of Cu, 0.1% to 0.6% by mass of Ni, and 0.03% to 0.6% by mass of Co.

Furthermore, the stainless steel sheet further contains, in addition to the composition described above, one or two or more selected from 0.04% to 1.0% by mass of V, 0.04% to 5.0% by mass of W, 0.04% to 1.0% by mass of Ta, and 0.02% to 1.0% by mass of Ti.

Furthermore, the stainless steel sheet has a thickness of 0.5 mm or less and the steel sheet is used for forming a raw material pipe for single-layer or double-layer automotive exhaust bellows pipe, the raw material pipe having an outside diameter A of 28 to 80 mm. The outside diameter A of the raw material pipe for bellows pipe corresponds to an outside diameter of a steel pipe before being formed into the bellows pipe and is substantially the same as the outside diameter A at the bottom of the bellows pipe.

Furthermore, the stainless steel sheet has an average crystal grain diameter of 35 μm or less.

Furthermore, the stainless steel sheet has a surface roughness Ra of 0.4 μm or less. The surface roughness Ra is a value obtained by measuring an arithmetic mean roughness Ra in a direction perpendicular to the rolling direction of the steel sheet according to JIS B0601 (1997) using a contact-type surface roughness tester according to JIS B0651.

The ferritic stainless steel sheet has good uniform elongation properties and excellent properties, such as high-temperature salt corrosion resistance and high-temperature fatigue properties. Consequently, a raw material pipe for bellows pipe formed using the ferritic stainless steel sheet has excellent formability and high-temperature properties, and thus is suitable for use in a raw material pipe for bellows pipe used in an automotive exhaust system.

REFERENCE NUMERALS 1 raw material pipe for bellows pipe (untreated pipe for forming bellows)
2 rod
3 clamp die
4 forming die
5 seal packing
6 formed peak
Φ outside diameter at peak
A outside diameter at bottom (outside diameter of raw material pipe for bellows pipe)
H peak height

DETAILED DESCRIPTION

Bellows are generally produced by subjecting untreated pipes to hydraulic bulge forming. FIG. 6 is a schematic diagram showing a hydraulic forming process in which one bulge is formed. Reference numeral 1 represents an untreated pipe for forming bellows. After the untreated pipe 1 is placed as illustrated in FIG. 6, the untreated pipe is filled with a liquid and a pressure is applied thereto so that the pipe wall is bulged outwardly between a clamp die 3 and a forming die 4. Then, the clamp die 3 is axially compressed to form a peak 6. By repeating this procedure, a bellows having many peaks is produced. In this process, although die costs are low, productivity is low compared with a process in which a predetermined number of peaks are formed in one hydraulic forming operation, which is disadvantageous. However, forming can be performed using relatively simple dies, and the number of peaks and the peak height H can be freely set. Thus, a bellows with a desired shape and number of peaks can be formed, which is advantageous. Consequently, elongation properties, in particular, uniform elongation properties, are believed to be important as properties required for the material for the untreated pipe. The reason for this is that if nonuniform deformation occurs even at one position, a local thinning which is a source of cracks arise.

Even if cracks do not occur, the lifetime of the bellows is significantly decreased. We conducted bellows forming tests using hydraulic bulge forming and tensile tests using JIS13B test pieces on various ferritic stainless steel sheets, and studied the relationship between uniform elongation measured with JIS 13B test pieces and the maximum possible peak height Hmax (one half of the difference between the outside diameter at a peak and the outside diameter at a bottom of a bellows pipe) in bellows formation. As a result, no distinct relationship was observed between both properties.

Then, the degree of uniform elongation was measured with respect to tensile test pieces having various shapes, and the relationship between the shape and the maximum possible peak height Hmax was studied. As a result, a correlation was found between the uniform elongation and the maximum possible peak height Hmax in bellows formation when measurement was performed using a tensile test piece with a special shape having a parallel portion with a width of 150 mm and a length of 25 mm. This is in common with the formation of bellows in which, if nonuniform deformation occurs even at one position in a broad region, cracks are caused, and shows that it is possible to evaluate bellows formability by devising the method of measuring uniform elongation.

Accordingly, we studied the effects of various additive elements on the uniform elongation of ferritic stainless steel sheets. Among them, a B addition experiment in which the improvement effect was observed will be described below.

Experiment 1

Steels each having a basic composition including 0.008% by mass of C, 0.41% by mass of Si, 0.31% by mass of Mn, 0.03% by mass of P, 0.003% by mass of S, 14.5% by mass of Cr, 0.03% by mass of Al, 0.01% by mass of N, 0.47% by mass of Nb, and 1.35% by mass of Mo and having a B content in a range of 0.0001% to 0.0040% by mass were subjected to refining and ingot-making on a laboratory scale. Each of the resulting ingots was heated at 1,170° C. for one hour, and then subjected to hot rolling to form a hot-rolled steel sheet with a thickness of 3.5 mm. The hot-rolled steel sheet was subjected to annealing at 1,070° C. for 30 seconds, followed by cold rolling to form a cold-rolled steel sheet with a thickness of 0.4 mm. The cold-rolled steel sheet was subjected to annealing at 1,030° C. for 30 seconds to form a cold-rolled and annealed steel sheet. A tensile test piece having the special shape described above (parallel portion width: 150 mm, parallel portion length: 25 mm) was cut out from the cold-rolled and annealed steel sheet parallel to the rolling direction. The resulting tensile test piece was subjected to a tensile test to measure uniform elongation.

Figure 1:
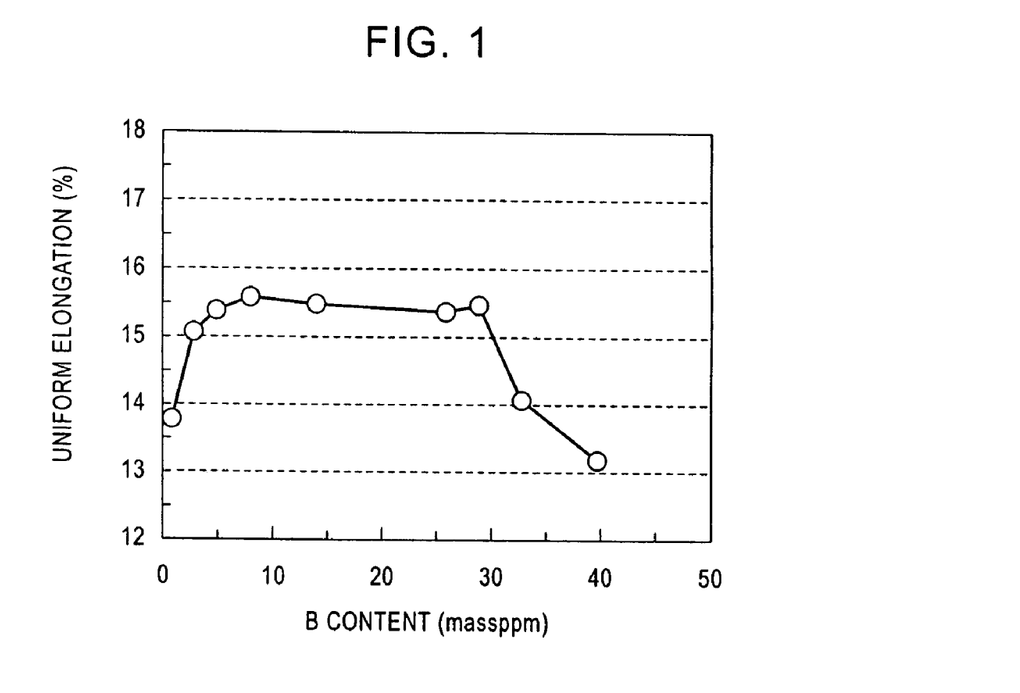
FIG. 1 is a graph showing the effect of the B content on uniform elongation.

FIG. 1 is a graph showing the effect of the B content on uniform elongation in the tensile test described above. As is evident from FIG. 1, a high degree of uniform elongation is obtained by adding 0.0003% by mass or more of B, i.e., bellows formability improves. However, when the B content exceeds 0.0030% by mass, the degree of uniform elongation decreases. Although not fully clear, the reason for the effect of B is believed to be that since B is an element that becomes segregated in grain boundaries and enhances grain boundary strength, addition of B in an amount of 0.0003% by mass or more prevents generation of fine cracks in grain boundaries during deformation. Furthermore, the reason for the decrease in the degree of uniform elongation when the B content exceeds 0.0030% by mass is believed to be that a large amount of B compound is segregated by the addition of an excess amount of B, and fine cracks are generated at the interface between the B compound and the matrix, resulting in a decrease in the degree of uniform elongation.

Next, to improve high-temperature properties (high-temperature salt corrosion resistance and high-temperature fatigue properties) of ferritic stainless steel sheets, the effects of various additive elements were studied. Among them, the experiment in which the effects were observed will be described below.

Experiment 2

Steels each having a basic composition including 0.01% by mass of C, 0.31% by mass of Si, 0.34% by mass of Mn, 0.03% by mass of P, 0.005% by mass of S, 16% by mass of Cr, 0.018% by mass of Al, 0.01% by mass of N, 1.45% by mass of Mo, and 0.0006% by mass of B and having a Nb content in a range of 0.19% to 0.74% by mass were subjected to refining and ingot-making on a laboratory scale. Each of the resulting ingots was heated at 1,170° C. for one hour, and then subjected to hot rolling to form a hot-rolled steel sheet with a thickness of 3.5 mm. The hot-rolled steel sheet was subjected to annealing at 1,070° C. for 30 seconds, followed by cold rolling to form a cold-rolled steel sheet with a thickness of 0.4 mm. The cold-rolled steel sheet was subjected to annealing at 1,030° C. for 30 seconds to form a cold-rolled and annealed steel sheet. The resulting cold-rolled and annealed steel sheet was subjected to the high-temperature salt corrosion test and high-temperature fatigue test described below.

High-Temperature Salt Corrosion Test

The surface and end face of each test piece of the cold-rolled and annealed steel sheet were polished with #400 emery paper, and then the test piece was subjected to a corrosion test, in which one cycle consisted of immersion in saturated saline (26% NaCl aqueous solution) at normal temperature for 5 minutes, heating in air at 750° C. for 2 hours, and cooling to room temperature. After 25 cycles were performed, corrosion products generated on the surface of the test piece were removed using an aqueous solution of ammonium citrate. Then, a decrease in the thickness of the test piece (corrosion depth) was measured to evaluate high-temperature salt corrosion resistance.

High-Temperature Fatigue Test

A completely-reversed high-temperature fatigue test was carried out using a Schenck type high-temperature fatigue testing machine, in which bending stress applied to a test piece was varied under the conditions of 750° C. and 22 Hz. The maximum bending stress at which no fracture occurred even after bending one million times was determined as a fatigue limit.

Experiment 3

Steels each having a basic composition including 0.01% by mass of C, 0.31% by mass of Si, 0.34% by mass of Mn, 0.03% by mass of P, 0.005% by mass of S, 16% by mass of Cr, 0.018% by mass of Al, 0.01% by mass of N, 0.47% by mass of Nb, and 0.0006% by mass of B and having a Mo content in a range of 0.65% to 2.41% by mass were subjected to refining and ingot-making on a laboratory scale. Each of the resulting ingots was formed into a cold-rolled and annealed steel sheet with a thickness of 0.4 mm under the same conditions as in Experiment 2. The resulting cold-rolled and annealed steel sheet was subjected to the high-temperature salt corrosion test and high-temperature fatigue test.

Figure 2:
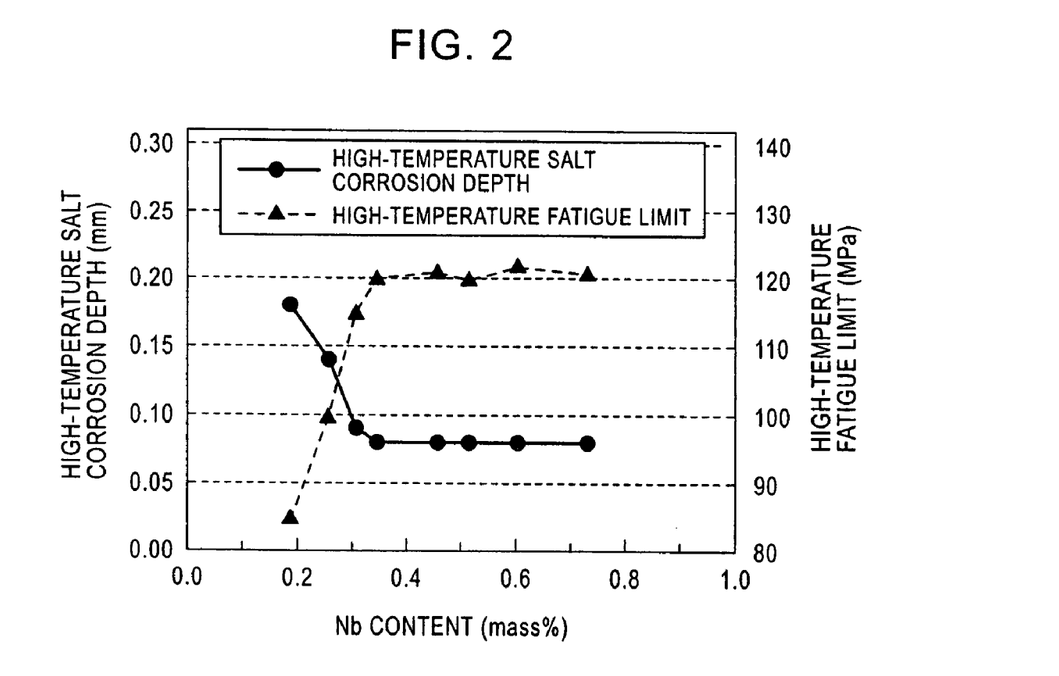
FIG. 2 is a graph showing the effect of the Nb content on the high-temperature salt corrosion depth and high-temperature fatigue limit.
Figure 3:
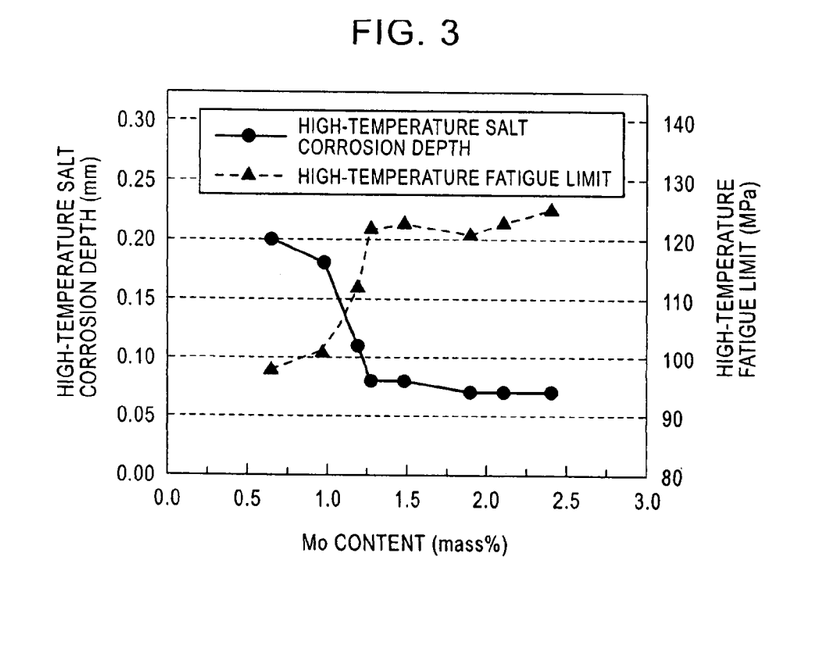
FIG. 3 is a graph showing the effect of the Mo content on the high-temperature salt corrosion depth and high-temperature fatigue limit.

FIG. 2 is a graph showing the effect of the Nb content on high-temperature salt corrosion resistance and high-temperature fatigue properties. As is evident from FIG. 2, steel sheets having excellent high-temperature salt corrosion resistance and high-temperature fatigue properties can be obtained by adding 0.3% by mass or more of Nb. Furthermore, FIG. 3 is a graph showing the effect of the Mo content on high-temperature salt corrosion resistance and high-temperature fatigue properties. As is evident from FIG. 3, steel sheets having excellent high-temperature salt corrosion resistance and high-temperature fatigue properties can be obtained by adding 1.25% by mass or more of Mo.

Experiment 4

In the cold-rolled steel sheets with a B content of 8 mass ppm (0.0008% by mass) used in Experiment 1, by changing the final annealing temperature in a range of 990° C. to 1,070° C., cold-rolled and annealed steel sheets having various average grain diameters in a range of 19 to 73 μm were obtained. A special tensile test piece (parallel portion width: 150 mm, parallel portion length: 25 mm) as in Experiment 1 was cut out from each of the cold-rolled and annealed steel sheets parallel to the rolling direction. The resulting tensile test piece was subjected to a tensile test to measure the degree of uniform elongation.

Figure 4:
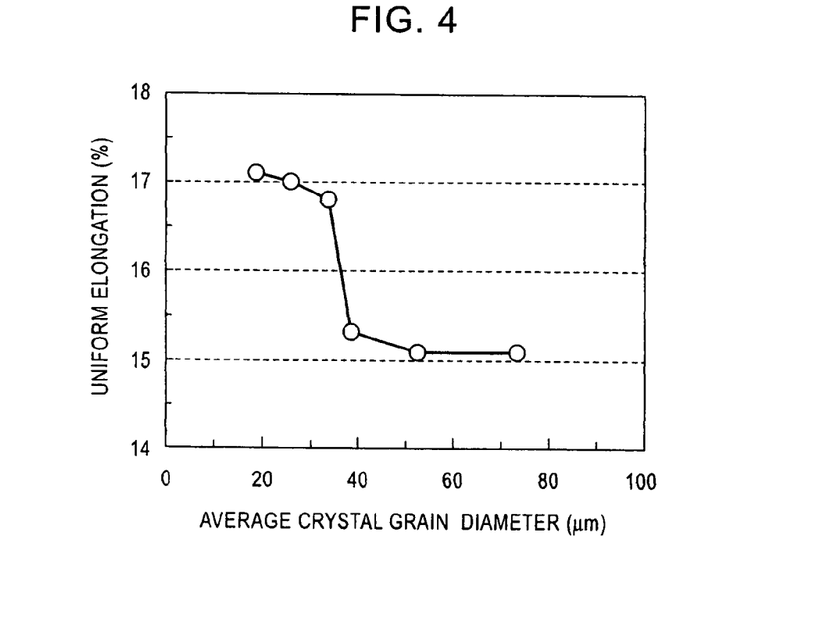
FIG. 4 is a graph showing the effect of the average crystal grain diameter on uniform elongation.

The measurement results thereof are shown in FIG. 4. As is evident from FIG. 4, if the average crystal grain diameter of the steel sheet is 35 μm or less, the uniform elongation, which is an index of bellows formability, increases. The reason for the increase in uniform elongation at an average crystal grain diameter of 35 μm or less is believed to be that since the crystal grains are refined, the number of crystal grains present in the thickness direction of the cross section of the steel sheet increases, and strain disperses uniformly.

Experiment 5

In the cold-rolled and annealed steel sheets with a B content of 8 mass ppm (0.0008% by mass) produced in Experiment 1, the surface roughness, in terms of arithmetic mean roughness Ra, was changed in a range of 0.1 to 1.08 μm by changing the surface roughness of a cold-rolling roll (in a range of 0.07 to 0.80 μm in terms of arithmetic mean roughness Ra). A special tensile test piece (parallel portion width: 150 mm, parallel portion length: 25 mm) as in Experiment 1 was cut out from each of the cold-rolled and annealed steel sheets parallel to the rolling direction. The resulting tensile test piece was subjected to a tensile test to measure the degree of uniform elongation.

Figure 5:
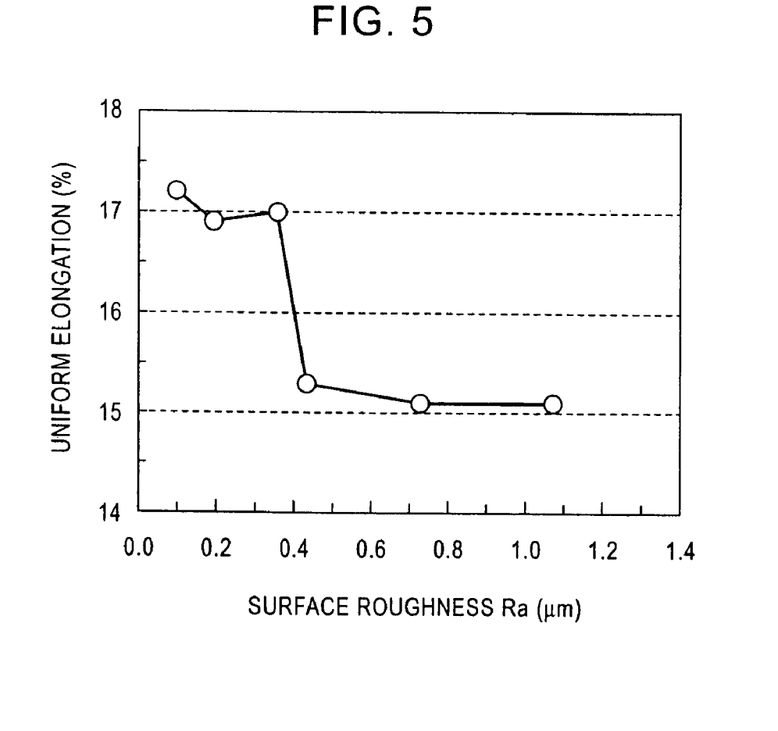
FIG. 5 is a graph showing the effect of the surface roughness Ra of steel sheet on uniform elongation.

The measurement results thereof are shown in FIG. 5. As is evident from the results of FIG. 5, if the surface roughness of the steel sheet, in terms of arithmetic mean roughness Ra, is 0.4 μm or less, the uniform elongation, which is an index of bellows formability, increases. The reason for this is believed to be that when the surface roughness Ra exceeds 0.4 μm, irregularities on the surface serve as sources of cracks, resulting in a decrease in uniform elongation.

The composition of the ferritic stainless steel sheet will now be described below.

C: about 0.015% by mass or less

C is an element that decreases the ductility and toughness of the steel sheet and, in particular, adversely affects bellows formability, at which the present invention is mainly directed.

Thus, it is preferable to decrease the C content as much as possible. The upper limit of the C content is set at 0.015% by mass. The C content is preferably 0.010% by mass or less. No adverse effect is caused even if the C content is extremely low. Thus, it is not necessary to set the lower limit.

Si: about 1.0% by mass or less

Si is an element that is effective in improving oxidation resistance and high-temperature salt corrosion resistance, but that hardens the steel and decreases ductility. In particular, if the Si content exceeds 1.0% by mass, bellows formability, at which the present invention is mainly directed, starts decreasing markedly. Therefore, the upper limit of the Si content is set at 1.0% by mass. Although the lower limit is not particularly specified, the Si content is preferably 0.2% by mass or more, and more preferably 0.3% to 0.6% by mass, from the standpoint of ensuring oxidation resistance and high-temperature salt corrosion resistance.

Mn: about 1.0% by mass or less

Mn is an element that is effective in decreasing weld-solidification crack sensitivity in the Nb-added ferritic stainless steel sheet. However, since Mn is an austenite-stabilizing element, addition of a large amount of Mn decreases the stability of the ferrite phase at high temperature and, in some cases, may generate an austenite phase, resulting in a decrease in oxidation resistance. Furthermore, Mn hardens the steel by solid-solution hardening and, in particular, if the Mn content exceeds 1.0% by mass, formability decreases significantly. Therefore, the upper limit is set at 1.0% by mass. Although the lower limit of the Mn content is not particularly set, from the standpoint of reducing weld-solidification crack sensitivity, the Mn content is preferably 0.3% by mass or more, and more preferably 0.4% to 0.7% by mass.

P: about 0.04% by mass or less

P is an element that decreases toughness and ductility. In particular, if the P content exceeds 0.04% by mass, toughness and ductility are significantly decreased. Therefore, the upper limit is set at 0.04% by mass. Preferably, the P content is 0.03% by mass or less. Even if the P content is very low, the effect of the present invention is not adversely affected. Thus, it is not necessary to set the lower limit.

S: about 0.010% by mass or less

S is an element that decreases corrosion resistance and oxidation resistance. In particular, if the S content exceeds 0.010% by mass, corrosion resistance and oxidation resistance are significantly decreased. Therefore, the upper limit is set at 0.010% by mass. Preferably, the S content is 0.007% by mass or less. Even if the S content is low, the effect is not adversely affected. Thus, it is not necessary to set the lower limit.

Cr: about 11% to 19% by mass

Cr is a major alloying element constituting the ferritic stainless steel sheet and is an essential element for improving corrosion resistance and oxidation resistance. The Cr content must be 11% by mass or more to obtain such effects. On the other hand, addition of a large amount of Cr not only hardens the steel, but also decreases bellows formability. Therefore, the upper limit of the Cr content is 19% by mass. Preferably, the Cr content is in a range of 13% to 19% by mass.

N: about 0.015% by mass or less

N is an element that decreases toughness and ductility. The N content is preferably minimized. In particular, N adversely affects bellows formability. Therefore, the N content is limited to 0.015% by mass or less, and preferably 0.010% by mass or less. Even if the N content is low, bellows characteristics are not adversely affected. Thus, the lower limit is not set.

Al: about 0.15% by mass or less

Al is a strong deoxidizing element and is used to decrease oxygen in steel during refining. Al is an element that is also effective in improving oxidation resistance. However, addition of an excessive amount of Al decreases toughness and ductility. In particular, this tendency becomes more remarkable if the Al content exceeds 0.15% by mass. Therefore, the Al content is limited to 0.15% by mass or less. Preferably, the Al content is 0.07% by mass or less. Although the lower limit is not particularly specified, for the purpose of complete deoxidization during refining, Al is preferably added in an amount of 0.003% by mass or more.

Nb: about 0.3% to about 0.7% by mass, Mo: about 1.25% to about 2.5% by mass

Mo and Nb are elements that improve high-temperature properties and are important additive elements. As is clear from Experiment 2 described above, addition of 0.3% by mass or more of Nb is effective in improving high-temperature salt corrosion resistance and high-temperature fatigue properties. However, if the Nb content exceeds 0.7% by mass, toughness and ductility are markedly decreased. Therefore, the Nb content is set in a range of 0.3% to 0.7% by mass, and preferably in a range of 0.4% to 0.55% by mass.

Furthermore, as is clear from Experiment 3 described above, addition of 1.25% by mass or more of Mo is effective in improving high-temperature salt corrosion resistance and high-temperature fatigue properties. However, if the Mo content exceeds 2.5% by mass, ductility and toughness are decreased. Therefore, the Mo content is set in a range of 1.25% to 2.5% by mass, and preferably in a range of 1.35% to 2.25% by mass.

B: about 0.0003% to about 0.003% by mass

B is an important element that improves bellows formability and is an essential element. As is clear from the results of Experiment 1 described above (FIG. 1), by adding 0.0003% by mass or more of B, the degree of uniform elongation is improved and excellent bellows form ability is obtained. On the other hand, if the B content exceeds 0.003% by mass, the degree of uniform elongation is decreased. Therefore, the B content is set in a range of 0.0003% to 0.003% by mass, and more preferably in a range of 0.0005% to 0.0020% by mass.

Furthermore, in addition to the essential components described above, the following components can be added to the ferritic stainless steel sheet according to demand characteristics.

One or two or more selected from Cu: about 0.1% to about 0.6% by mass, Ni: about 0.1% to about 0.6% by mass, and Co: about 0.03% to about 0.6% by mass Cu, Ni, and Co are elements that are effective in improving toughness and corrosion resistance. It is preferable to add one or two or more selected from 0.1% by mass or more of Cu, 0.1% by mass or more of Ni, and 0.03% by mass or more of Co to obtain such effects. However, since excessive addition of these elements hardens the steel, preferably, the upper limits are set to be 0.6% by mass for Cu, 0.6% by mass for Ni, and 0.6% by mass for Co. More preferable ranges are 0.20% to 0.50% by mass for Cu, 0.20% to 0.50% by mass for Ni, and 0.04% to 0.40% by mass for Co.

One or two or more selected from V: about 0.04% to about 1.0% by mass, W: about 0.04% to about 5.0% by mass, Ta: about 0.04% to about 1.0% by mass, and Ti: about 0.02% to about 1.0% by mass In a steel sheet to which a large amount of Nb is added, as in the ferritic stainless steel sheet by the addition of one or two or more selected from V, W, Ta, and Ti, the carbonitrides generated are finely dispersed to refine crystal grains, and thereby toughness can be improved. Furthermore, in the case where contamination due to C and N occurs during welding, by fixing the contamination as carbonitrides of V, etc. to inhibit generation of Cr carbonitrides, it is possible to prevent formation of a Cr-deficient layer, resulting in an improvement in corrosion resistance in the weld zone. Preferred amounts to be added are 0.04% by mass or more for V, 0.04% by mass or more for W, 0.04% by mass or more for Ta, and 0.02% by mass or more of Ti to obtain such effects. However, since addition of excessively large amounts decreases the toughness of the steel sheet itself and decreases productivity, preferably, the upper limits are set to be 1.0% by mass for V, 5.0% by mass for W, 1.0% by mass for Ta, and 1.0% by mass for Ti. More preferable ranges are 0.06% to 0.5% by mass for V, 0.1% to 3.5% by mass for W, 0.1% to 0.5% by mass for Ta, and 0.05% to 0.5% by mass for Ti.

A preferred method for producing the steel will now be described below. Production conditions for the steel are not particularly limited, and commonly used production methods for ferritic stainless steel sheets can be suitably used.

For example, a molten steel having a composition adjusted within the proper ranges described above is refined using a refining furnace, such as a converter or an electric furnace, or using refining, such as ladle refining or vacuum refining. Then, slabs are formed by continuous casting or ingot-casting-blooming, and hot rolling is performed. Furthermore, as necessary, the hot-rolled steel sheet may be subjected to annealing and pickling. Furthermore, by carrying out the steps of cold rolling, final annealing, and pickling in that order, a cold-rolled and annealed steel sheet is produced. Furthermore, as necessary, in particular, to adjust the surface roughness Ra of the steel sheet, skinpass rolling may be performed.

In a more preferable production method, conditions for the hot-rolling step and the cold-rolling step are partially specified. In steel-making, preferably, the molten steel containing the essential components and the components added according to need is subjected to refining using a converter, an electric furnace, or the like, and secondary refining using a VOD process. The refined molten steel can be formed into a steel raw material according to a known production method. From the standpoint of productivity and quality, preferably, continuous casting is used. The steel raw material obtained by continuous casting is, for example, heated at 1,000° C. to 1,250° C., followed by hot rolling to form a hot-rolled steel sheet having a desired thickness. The hot-rolled steel sheet is, as necessary, subjected to batch annealing at 600° C. to 800° C. or continuous annealing at 900° C. to 1,100° C., and then is subjected to descaling by pickling or the like. Thereby, a hot-rolled steel sheet product is obtained. Furthermore, according to need, scales may be removed by shot blasting before pickling.

Furthermore, the hot-rolled and annealed steel sheet obtained above is subjected to a cold rolling step to form a cold-rolled steel sheet. In the cold rolling step, for production reasons, according to need, two or more cold rolling operations including intermediate annealing may be performed. The total rolling reduction in the cold rolling step including one or two or more cold rolling operations is 60% or more, and preferably 70% or more. The cold-rolled steel sheet is subjected to continuous annealing (final annealing) at 950° C. to 1,150° C., and preferably at 980° C. to 1,120° C., and then to pickling to form a cold-rolled and annealed steel sheet. Furthermore, according to need, in particular, to adjust the surface roughness Ra of the steel sheet, light rolling (skinpass rolling or the like) may be performed after cold rolling and annealing so that the shape and quality of the steel sheet can be adjusted.

The cold-rolled and annealed steel sheet produced as described above is subjected to bending, and a raw material pipe for bellows pipe is produced by a known arc welding process, such as tungsten inert gas (TIG) welding or plasma welding, or laser welding. The resulting raw material pipe for bellows pipe is subjected to hydraulic forming to form a bellows pipe with a predetermined outside diameter at a peak.

Preferably, the ferritic stainless steel sheet has a thickness of 0.5 mm or less. As described above, a bellows has an accordion shape having a parallel corrugated wall and absorbs displacement resulting from thermal expansion and vibration. The displacement is loaded as bending on the bellows, and in such a case, if the thickness of the sheet increases, the strain of the material increases. The strain exceeding the elastic limit of the material corresponds to plastic strain, which may cause fatigue breaking of the bellows pipe. Consequently, from the standpoint of preventing fatigue breaking, the thickness of the sheet is preferably as small as possible. In view of the productivity and production costs of stainless steel sheets as raw materials, preferably the thickness of the sheet is set at 0.5 mm or less, which is in a range that does not substantially cause problems.

Furthermore, the raw material pipe for bellows pipe formed using the ferritic stainless steel sheet as the raw material preferably is a single-layer or double-layer pipe with an outside diameter A of 28 to 80 mm. The reason for this is that, although the amount of displacement within the elastic limit, which can be absorbed by the bellows, depends on the peak height H, even at the same peak height H, as the outside diameter A of the raw material pipe decreases, the tube expanding ratio at the peak increases, which makes it difficult to form the bellows. That is, when the outside diameter A of the raw material pipe is small, the peak height H that can be obtained is small. Consequently, in use in automotive exhaust bellows, to allow the bellows to absorb the predetermined amount of displacement, the outside diameter A of the raw material pipe is preferably set at 28 mm or more. On the other hand, when the outside diameter A of the raw material pipe is large and thin, collapse and buckling easily occur due to insufficient rigidity of the bellows itself, and thus practical use is difficult. Therefore, the outside diameter A of the raw material pipe is preferably set at 80 mm or less.

Furthermore, when the rigidity of the bellows pipe is required in design, it is conceivable to increase the thickness t (thickness t of the sheet). However, as described above, the increase in the thickness t causes fatigue breaking, which is not desirable. It is possible to ensure rigidity and strength by stacking thin steel sheets to form a multilayer pipe to avoid such a problem. Specifically, it is preferable to form a double-layer pipe. The formation of a triple layer or more is not preferable from the standpoint of productivity and production costs. Furthermore, when the thickness is the same, a double-layer pipe has lower rigidity and higher flexibility than a single-layer pipe, and thus the fatigue strength is also improved, which is advantageous. Furthermore, depending on the service environment, different characteristics may be required between the inner surface and the outer surface of the bellows. In such a case, it is preferable to form a double-layer pipe using raw materials that satisfy the individual requirements.

EXAMPLES

Example 1

Each of steels having compositions shown in Table 1 was subjected to refining in a high-frequency induction heating vacuum melting furnace to form 50 kg of ingot. The resulting ingot was heated at 1,170° C. for one hour, and then subjected to hot rolling at a finisher delivery temperature of 800° C. to form a hot-rolled steel sheet with a thickness of 3.5 mm. The hot-rolled steel sheet was subjected to annealing at 1,040° C. for 30 seconds. Then, oxide scales formed on surfaces of the steel sheet were removed by pickling, and cold rolling was performed to form a cold-rolled steel sheet having a thickness of 0.4 mm. The cold-rolled steel sheet was subjected to degreasing and annealing at 1,030° C. for 30 seconds to form a cold-rolled and annealed steel sheet. A tensile test piece having the special shape described above (parallel portion width 150 mm, parallel portion length: 25 mm) was cut out from the cold-rolled and annealed steel sheet parallel to the rolling direction. The resulting tensile test piece was subjected to a tensile test to measure the degree of uniform elongation. Furthermore, the test piece was also subjected to the high-temperature salt corrosion test and the high-temperature fatigue test described above, and the characteristics of each steel sheet were evaluated.

The test results are shown in Table 2. As is evident from Table 2, in our ferritic stainless steel sheets, the uniform elongation, which is an index of bellows formability, is high, and the high-temperature salt corrosion resistance and high-temperature fatigue properties are superior compared with the steel sheets of Comparative Examples.

Example 2

Each of steels having compositions shown in Table 3 was subjected to refining in a high-frequency induction heating vacuum melting furnace to form 50 kg of ingot. The resulting ingot was heated at 1,170° C. for one hour, and then subjected to hot rolling at a finisher delivery temperature of 800° C. to form a hot-rolled steel sheet with a thickness of 3.5 mm. The hot-rolled steel sheet was subjected to annealing at 1,040° C. for 30 seconds. Then, oxide scales formed on surfaces of the steel sheet were removed by pickling, and cold rolling was performed to form a cold-rolled steel sheet having a thickness of 0.4 mm, followed by degreasing. Then, by changing the average grain diameter D of the steel sheets by annealing at 990° C. to 1,050° C. for 30 seconds, cold-rolled and annealed steel sheets having various average grain diameters were obtained.

A tensile test piece having the special shape (parallel portion width: 150 mm, parallel portion length: 25 mm) described above was cut out from each of the cold-rolled and annealed steel sheets parallel to the rolling direction. The resulting tensile test piece was subjected to a tensile test to measure the degree of uniform elongation. The average grain diameter was measured by a method in which a cross section parallel to the rolling direction of the steel sheet (cross section perpendicular to the surface of the sheet) was polished and etched. Then, an area of 0.5 mm$^2$ or more was observed with an optical microscope, and the number of crystal grains in the field of view was obtained. The average area of the individual crystal grains was obtained from the number of crystal grains and the area of the field of view observed, and the diameter of the corresponding circle was calculated and defined as the average crystal grain diameter. Furthermore, the test piece was also subjected to the high-temperature salt corrosion test and the high-temperature fatigue test described above, and the characteristics of each steel sheet were evaluated.

The test results are shown in Table 4. As is evident from Table 4, in our ferritic stainless steel sheets, the uniform elongation, which is an index of bellows formability, is high, and the high-temperature salt corrosion resistance and high-temperature fatigue properties are superior compared with the steel sheets of Comparative Examples. Furthermore, in the steel sheets shown in Tables 3 and 4 (Steel Nos. 1 to 6), the uniform elongation is further improved by setting the average crystal grain diameter D at 35 μm or less compared with the steel sheets in Example 1 shown in Tables 1 and 2 (Steel Nos. 1 to 6).

Example 3

Each of steels having compositions shown in Table 5 was subjected to refining in a high-frequency induction heating vacuum melting furnace to form 50 kg of ingot. The resulting ingot was heated at 1,170° C. for one hour, and then subjected to hot rolling at a finisher delivery temperature of 800° C. to form a hot-rolled steel sheet with a thickness of 3.5 mm. The hot-rolled steel sheet was subjected to annealing at 1,040° C. for 30 seconds. Then, oxide scales formed on surfaces of the steel sheet were removed by pickling, and cold rolling was performed to form a cold-rolled steel sheet having a thickness of 0.4 mm, followed by degreasing. Then, annealing was performed at 1,030° C. for 30 seconds to form a cold-rolled and annealed steel sheet. In this step, the surface roughness of the individual steel sheets was changed by changing the surface roughness of a working roll used for cold rolling (in a range of 0.07 to 0.80 μm in terms of arithmetic mean roughness Ra). A tensile test piece having the special shape (parallel portion width: 150 mm, parallel portion length: 25 mm) described above was cut out from each of the cold-rolled and annealed steel sheets parallel to the rolling direction. The resulting tensile test piece was subjected to a tensile test to measure the degree of uniform elongation. Furthermore, the test piece was also subjected to the high-temperature salt corrosion test and the high-temperature fatigue test described above, and the characteristics of each steel sheet were evaluated. The surface roughness of each steel sheet was obtained by measuring an arithmetic mean roughness Ra in a direction perpendicular to the rolling direction of the steel sheet according to JIS B0601 (1997) using a contact-type surface roughness tester according to JIS B0651.

The test results are shown in Table 6. As is evident from Table 6, in our ferritic stainless steel sheets, the uniform elongation, which is an index of bellows formability, is high, and the high-temperature salt corrosion resistance and high-temperature fatigue properties are superior compared with the steel sheets of Comparative Examples. Furthermore, in the steel sheets shown in Tables 5 and 6 (Steel Nos. 1 to 6), the uniform elongation is further improved by setting the surface roughness Ra at 0.40 μm or less compared with the steel sheets in Example 1 shown in Tables 1 and 2 (Steel Nos. 1 to 6).

Example 4

Bending was performed on cold-rolled and annealed stainless steel sheets formed of Steel No. 1 in Table 1 of Example 1, Steel No. 1 in Table 3 of Example 2, and Steel No. 1 in Table 5 of Example 3. Thereby, raw material pipes for bellows pipes with an outside diameter of 50 mm were produced by TIG welding. It was possible to form the resulting raw material pipes for bellows pipes into bellows pipes with a peak height of 13 mm by hydraulic forming without causing cracks.

INDUSTRIAL APPLICABILITY

Ferritic stainless steel sheets can also be used in applications and fields requiring high-temperature properties, such as in the field of heat exchangers and fuel cells.

TABLE 1

| Steel No. | Chemical composition (mass %) | | | | | | | | | | | | Remarks |
|---|---|---|---|---|---|---|---|---|---|---|---|---|---|
| | C | Si | Mn | P | S | Cr | N | Al | Mo | Nb | B | Others | |
| 1 | 0.005 | 0.29 | 0.77 | 0.031 | 0.004 | 15.2 | 0.006 | 0.004 | 1.66 | 0.49 | 0.0005 | — | Example of invention |
| 2 | 0.006 | 0.33 | 0.94 | 0.028 | 0.003 | 18.8 | 0.008 | 0.011 | 2.03 | 0.56 | 0.0011 | — | Example of invention |
| 3 | 0.009 | 0.88 | 0.36 | 0.033 | 0.005 | 13.4 | 0.007 | 0.041 | 1.86 | 0.49 | 0.0004 | — | Example of invention |
| 4 | 0.006 | 0.27 | 0.36 | 0.028 | 0.001 | 14.9 | 0.008 | 0.022 | 1.46 | 0.51 | 0.0006 | Co: 0.051, Ni: 0.21 | Example of invention |
| 5 | 0.004 | 0.55 | 0.79 | 0.034 | 0.006 | 14.1 | 0.009 | 0.008 | 1.29 | 0.34 | 0.0007 | Ti: 0.11, V: 0.061, Cu: 0.21 | Example of invention |
| 6 | 0.011 | 0.28 | 0.34 | 0.022 | 0.004 | 17.2 | 0.007 | 0.078 | 1.47 | 0.62 | 0.0018 | W: 0.31, Ta: 0.11 | Example of invention |
| 7 | 0.006 | 0.31 | 0.68 | 0.030 | 0.003 | 15.1 | 0.007 | 0.011 | 1.61 | 0.52 | 0.0001 | — | Comparative Example |
| 8 | 0.005 | 0.27 | 0.71 | 0.028 | 0.004 | 15.3 | 0.005 | 0.018 | 1.60 | 0.24 | 0.0006 | — | Comparative Example |
| 9 | 0.006 | 0.31 | 0.74 | 0.033 | 0.001 | 15.2 | 0.006 | 0.008 | 0.77 | 0.52 | 0.0007 | — | Comparative Example |
| 10 | 0.004 | 0.06 | 0.38 | 0.021 | 0.001 | 14.8 | 0.006 | 0.035 | 1.81 | 0.49 | 0.0005 | W: 3.01 | Example of invention |
| 11 | 0.005 | 0.21 | 0.04 | 0.020 | 0.001 | 16.1 | 0.006 | 0.024 | 1.70 | 0.40 | 0.0006 | Ti: 0.60 | Example of invention |
| 12 | 0.006 | 0.33 | 0.15 | 0.024 | 0.003 | 13.8 | 0.005 | 0.005 | 1.52 | 0.51 | 0.0008 | Ta: 0.63 | Example of invention |
| 13 | 0.007 | 0.24 | 0.18 | 0.018 | 0.001 | 14.2 | 0.005 | 0.008 | 1.59 | 0.42 | 0.0011 | V: 0.70 | Example of invention |

TABLE 2

| Steel No. | Test results | | | Remarks |
|---|---|---|---|---|
| | Uniform elongation (%) | High-temperature salt corrosion depth (mm) | High-temperature fatigue limit (MPa) | |
| 1 | 15.1 | <0.1 | 123 | Example of invention |
| 2 | 15.3 | <0.1 | 121 | Example of invention |
| 3 | 15.2 | <0.1 | 124 | Example of invention |
| 4 | 15.2 | <0.1 | 124 | Example of invention |
| 5 | 15.1 | <0.1 | 123 | Example of invention |
| 6 | 15.3 | <0.1 | 124 | Example of invention |
| 7 | 13.9 | <0.1 | 123 | Comparative Example |
| 8 | 15.1 | 0.13 | 88 | Comparative Example |
| 9 | 15.2 | 0.15 | 94 | Comparative Example |
| 10 | 15.2 | <0.1 | 127 | Example of invention |
| 11 | 15.1 | <0.1 | 122 | Example of invention |
| 12 | 15.3 | <0.1 | 123 | Example of invention |
| 13 | 15.2 | <0.1 | 123 | Example of invention |

TABLE 3

| Steel No. | Chemical composition (mass %) | | | | | | | | | | | | Average crystal grain diameter (μm) | Remarks |
|---|---|---|---|---|---|---|---|---|---|---|---|---|---|---|
| | C | Si | Mn | P | S | Cr | N | Al | Mo | Nb | B | Others | | |
| 1 | 0.005 | 0.29 | 0.77 | 0.031 | 0.004 | 15.2 | 0.006 | 0.004 | 1.66 | 0.49 | 0.0005 | — | 29 | Example of invention |
| 2 | 0.006 | 0.33 | 0.94 | 0.028 | 0.003 | 18.8 | 0.008 | 0.011 | 2.03 | 0.56 | 0.0011 | — | 31 | Example of invention |
| 3 | 0.009 | 0.88 | 0.36 | 0.033 | 0.005 | 13.4 | 0.007 | 0.041 | 1.86 | 0.49 | 0.0004 | — | 19 | Example of invention |
| 4 | 0.006 | 0.27 | 0.36 | 0.028 | 0.001 | 14.9 | 0.008 | 0.022 | 1.46 | 0.51 | 0.0006 | Co: 0.051, Ni: 0.21 | 25 | Example of invention |
| 5 | 0.004 | 0.55 | 0.79 | 0.034 | 0.006 | 14.1 | 0.009 | 0.008 | 1.29 | 0.34 | 0.0007 | Ti: 0.11, V: 0.061, Cu: 0.21 | 26 | Example of invention |
| 6 | 0.011 | 0.28 | 0.34 | 0.022 | 0.004 | 17.2 | 0.007 | 0.078 | 1.47 | 0.62 | 0.0018 | W: 0.31, Ta: 0.11 | .23 | Example of invention |
| 7 | 0.006 | 0.31 | 0.68 | 0.030 | 0.003 | 15.1 | 0.007 | 0.011 | 1.61 | 0.52 | 0.0001 | — | 21 | Comparative Example |
| 8 | 0.005 | 0.27 | 0.71 | 0.028 | 0.004 | 15.3 | 0.005 | 0.018 | 1.60 | 0.24 | 0.0006 | — | 28 | Comparative Example |
| 9 | 0.006 | 0.31 | 0.74 | 0.033 | 0.001 | 15.2 | 0.006 | 0.008 | 0.77 | 0.52 | 0.0007 | — | 33 | Comparative Example |
| 10 | 0.006 | 0.33 | 0.94 | 0.028 | 0.003 | 18.8 | 0.008 | 0.011 | 2.03 | 0.56 | 0.0011 | — | 66 | Comparative Example |
| 11 | 0.007 | 0.06 | 0.31 | 0.021 | 0.001 | 16.2 | 0.006 | 0.045 | 1.86 | 0.43 | 0.0007 | Ti: 0.73 | 28 | Example of invention |
| 12 | 0.004 | 0.21 | 0.48 | 0.020 | 0.002 | 14.6 | 0.006 | 0.033 | 1.70 | 0.49 | 0.0006 | W: 2.91 | 25 | Example of invention |
| 13 | 0.006 | 0.30 | 0.07 | 0.024 | 0.003 | 16.2 | 0.008 | 0.004 | 1.53 | 0.48 | 0.0011 | Ta: 0.89 | 27 | Example of invention |
| 14 | 0.007 | 0.22 | 0.18 | 0.018 | 0.002 | 15.3 | 0.004 | 0.021 | 1.61 | 0.40 | 0.0005 | V: 0.59 | 30 | Example of invention |

TABLE 4

| Steel No. | Uniform elongation (%) | High-temperature salt corrosion depth (mm) | High-temperature fatigue limit (MPa) | Remarks |
|---|---|---|---|---|
| 1 | 16.4 | <0.1 | 123 | Example of invention |
| 2 | 16.5 | <0.1 | 121 | Example of invention |
| 3 | 16.7 | <0.1 | 124 | Example of invention |
| 4 | 16.7 | <0.1 | 124 | Example of invention |
| 5 | 16.6 | <0.1 | 123 | Example of invention |
| 6 | 16.7 | <0.1 | 124 | Example of invention |
| 7 | 14.6 | <0.1 | 123 | Comparative Example |
| 8 | 16.6 | 0.13 | 88 | Comparative Example |
| 9 | 16.4 | 0.15 | 94 | Comparative Example |
| 10 | 15.2 | <0.1 | 122 | Comparative Example |
| 11 | 16.2 | <0.1 | 122 | Example of invention |
| 12 | 16.5 | <0.1 | 128 | Example of invention |
| 13 | 16.3 | <0.1 | 124 | Example of invention |
| 14 | 16.2 | <0.1 | 123 | Example of invention |

TABLE 5

| Steel No. | C | Si | Mn | P | S | Cr | N | Al | Mo | Nb | B | Others | Ra (μm) | Remarks |
|---|---|---|---|---|---|---|---|---|---|---|---|---|---|---|
| 1 | 0.005 | 0.29 | 0.77 | 0.031 | 0.004 | 15.2 | 0.006 | 0.004 | 1.66 | 0.49 | 0.0005 |  | 0.24 | Example of invention |
| 2 | 0.006 | 0.33 | 0.94 | 0.028 | 0.003 | 18.8 | 0.008 | 0.011 | 2.03 | 0.56 | 0.0011 | — | 0.23 | Example of invention |
| 3 | 0.009 | 0.88 | 0.36 | 0.033 | 0.005 | 13.4 | 0.007 | 0.041 | 1.86 | 0.56 | 0.0004 | — | 0.36 | Example of invention |
| 4 | 0.006 | 0.27 | 0.36 | 0.028 | 0.001 | 14.9 | 0.008 | 0.022 | 1.46 | 0.51 | 0.0006 | Co: 0.051, Ni: 0.21 | 0.17 | Example of invention |
| 5 | 0.004 | 0.55 | 0.79 | 0.034 | 0.006 | 14.1 | 0.009 | 0.008 | 1.29 | 0.34 | 0.0007 | Ti: 0.11, V: 0.061, Cu: 0.21 | 0.22 | Example of invention |
| 6 | 0.011 | 0.28 | 0.34 | 0.022 | 0.004 | 17.2 | 0.007 | 0.078 | 1.47 | 0.62 | 0.0018 | W: 0.31, Ta: 0.11 | 0.37 | Example of invention |
| 7 | 0.006 | 0.31 | 0.68 | 0.030 | 0.003 | 15.1 | 0.007 | 0.011 | 1.61 | 0.52 | 0.0001 | — | 0.23 | Comparative Example |
| 8 | 0.005 | 0.27 | 0.71 | 0.028 | 0.004 | 15.3 | 0.005 | 0.018 | 1.60 | 0.24 | 0.0006 | — | 0.24 | Comparative Example |
| 9 | 0.006 | 0.31 | 0.74 | 0.033 | 0.001 | 15.2 | 0.006 | 0.008 | 0.77 | 0.52 | 0.0007 | — | 0.23 | Comparative Example |
| 10 | 0.006 | 0.33 | 0.94 | 0.028 | 0.003 | 18.8 | 0.008 | 0.011 | 2.03 | 0.56 | 0.0011 | — | 0.51 | Comparative Example |
| 11 | 0.005 | 0.10 | 0.52 | 0.022 | 0.002 | 15.6 | 0.007 | 0.025 | 1.78 | 0.49 | 0.0004 | W: 3.06 | 0.24 | Example of invention |
| 12 | 0.006 | 0.22 | 0.09 | 0.018 | 0.001 | 14.7 | 0.006 | 0.029 | 1.54 | 0.50 | 0.0006 | Ti: 0.72 | 0.14 | Example of invention |
| 13 | 0.005 | 0.09 | 0.40 | 0.023 | 0.004 | 16.7 | 0.006 | 0.004 | 1.44 | 0.47 | 0.0006 | Ta: 0.81 | 0.22 | Example of invention |
| 14 | 0.004 | 0.21 | 0.18 | 0.024 | 0.001 | 14.0 | 0.004 | 0.009 | 1.68 | 0.48 | 0.0011 | V: 0.69 | 0.18 | Example of invention |

TABLE 6

| Steel No. | Uniform elongation (%) | High-temperature salt corrosion depth (mm) | High-temperature fatigue limit (MPa) | Remarks |
|---|---|---|---|---|
| 1 | 16.6 | <0.1 | 123 | Example of invention |
| 2 | 16.7 | <0.1 | 121 | Example of invention |
| 3 | 16.4 | <0.1 | 124 | Example of invention |
| 4 | 16.7 | <0.1 | 124 | Example of invention |
| 5 | 16.4 | <0.1 | 123 | Example of invention |
| 6 | 16.7 | <0.1 | 124 | Example of invention |
| 7 | 14.5 | <0.1 | 123 | Comparative Example |
| 8 | 16.4 | 0.13 | 88 | Comparative Example |
| 9 | 16.3 | 0.15 | 94 | Comparative Example |
| 10 | 15.1 | <0.1 | 122 | Comparative Example |
| 11 | 16.2 | <0.1 | 129 | Example of invention |
| 12 | 16.1 | <0.1 | 125 | Example of invention |
| 13 | 16.2 | <0.1 | 124 | Example of invention |
| 14 | 16.3 | <0.1 | 124 | Example of invention |

The invention claimed is:

1. A ferritic stainless steel sheet for forming a raw material pipe for bellows pipe comprising about 0.015% by mass or less of C, about 1.0% by mass or less of Si, about 1.0% by mass or less of Mn, about 0.04% by mass or less of P, about 0.010% by mass or less of S, about 11% to about 19% by mass of Cr, about 0.015% by mass or less of N, about 0.15% by mass or less of Al, about 1.25% to about 2.5% by mass of Mo, about 0.3% to about 0.7% by mass of Nb, about 0.0003% to about 0.003% by mass of B, and the balance being Fe and incidental impurities, and having a thickness of about 0.5 mm or less, an average crystal grain diameter of about 35 μm or less, a surface roughness Ra of about 0.4 μm or less and a uniform elongation of 15.1% or more.

2. The ferritic stainless steel sheet according to claim 1, further comprising at least one selected from about 0.1% to about 0.6% by mass of Cu, about 0.1% to about 0.6% by mass of Ni, and about 0.03% to about 0.6% by mass of Co.

3. The ferritic stainless steel sheet according to claim 1, further comprising at least one selected from about 0.04% to about 1.0% by mass of V, about 0.04% to about 5.0% by mass of W, about 0.04% to about 1.0% by mass of Ta, and about 0.02% to about 1.0% by mass of Ti.

4. The ferritic stainless steel sheet according to claim 1, wherein the steel sheet forms a raw material pipe for single-layer or double-layer automotive exhaust bellows pipe, the raw material pipe having an outside diameter of about 28 to about 80 mm.

5. A ferritic stainless steel sheet for forming a raw material pipe for bellows pipe comprising about 0.015% by mass or less of C, about 1.0% by mass or less of Si, about 1.0% by mass or less of Mn, about 0.04% by mass or less of P, about 0.010% by mass or less of S, about 11% to about 19% by mass of Cr, about 0.015% by mass or less of N, about 0.15% by mass or less of Al, about 1.25% to about 2.5% by mass of Mo, about 0.3% to about 0.7% by mass of Nb, about 0.0003% to about 0.003% by mass of B, and the balance being Fe and incidental impurities, wherein the average crystal grain diameter of the stainless steel sheet is about 35 μm or less and the stainless steel sheet has a thickness of 0.5 mm or less and a uniform elongation of 15.1% or more.

6. The ferritic stainless steel sheet according to claim 5, further comprising at least one selected from about 0.1% to about 0.6% by mass of Cu, about 0.1% to about 0.6% by mass of Ni, and about 0.03% to about 0.6% by mass of Co.

7. The ferritic stainless steel sheet according to claim 5, further comprising at least one selected from about 0.04% to about 1.0% by mass of V, about 0.04% to about 5.0% by mass of W, about 0.04% to about 1.0% by mass of Ta, and about 0.02% to about 1.0% by mass of Ti.

8. The ferritic stainless steel sheet according to claim 5, wherein the thickness of the steel sheet is about 0.5 mm or less, and the steel sheet forms a raw material pipe for single- layer or double-layer automotive exhaust bellows pipe, the raw material pipe having an outside diameter of about 28 to about 80 mm.

\* \* \* \* \*